United States Patent [19]

Landgraf et al.

[11] 4,386,996
[45] Jun. 7, 1983

[54] APPARATUS FOR THE JACKETING OF STEEL PIPES

[75] Inventors: Helmut Landgraf, Duisburg; Walter Stucke, Ratingen, both of Fed. Rep. of Germany

[73] Assignee: Mannesmann Aktiengesellschaft, Dusseldorf, Fed. Rep. of Germany

[21] Appl. No.: 242,105

[22] Filed: Mar. 9, 1981

[30] Foreign Application Priority Data

Mar. 7, 1980 [DE] Fed. Rep. of Germany ....... 3009285

[51] Int. Cl.³ .................... B29D 23/04; B32B 31/00
[52] U.S. Cl. ........................ 156/382; 156/244.14; 156/500; 264/173; 264/174; 264/271.1; 264/279; 425/113
[58] Field of Search ............. 156/244.14, 244.21, 156/244.26, 244.27, 285, 382, 500, 501; 264/173, 174, 271.1, 272.11, 279; 425/113, 114, 133.1, 326.1, 342.1, 388, 392

[56] References Cited

U.S. PATENT DOCUMENTS

| 2,956,305 | 10/1960 | Raydt et al. | 156/244.14 |
| 3,737,490 | 6/1973 | Nicholson | 264/174 |
| 3,895,085 | 7/1975 | Suzuki et al. | 264/173 |
| 4,041,198 | 8/1977 | McPherson | 264/173 |
| 4,102,955 | 7/1978 | Baker et al. | 264/174 |
| 4,130,616 | 12/1978 | Clifford | 264/173 |

*Primary Examiner*—Caleb Weston
*Attorney, Agent, or Firm*—Ralf H. Siegemund

[57] ABSTRACT

Steel pipes pass through an extruder with a low-pressure antechamber for obtaining suction of an extruded hose against the pipe. The entrance to that antechamber is sealed by a combination of rubber elastic and spring steel disks, the latter having tongues being deflected by the pipe entering the chamber, and tongues of one disk sealingly cover the slots of an adjacent disk.

6 Claims, 3 Drawing Figures

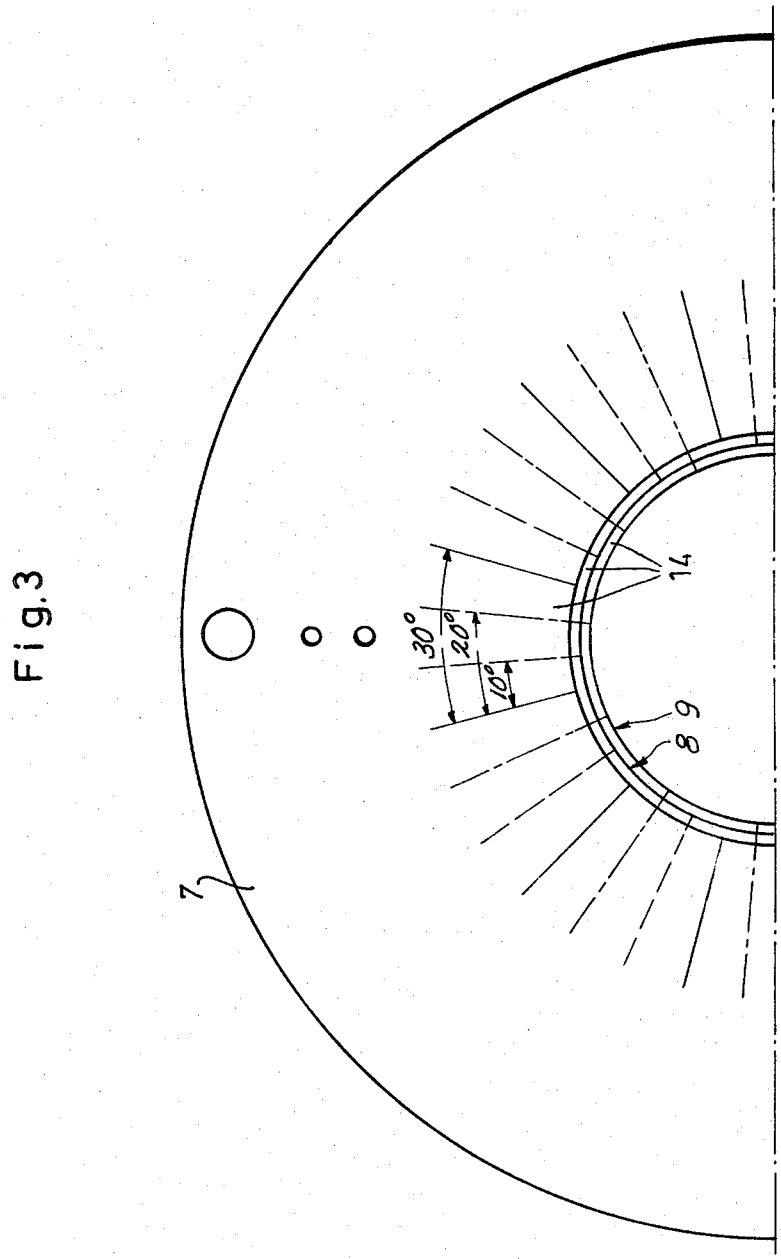

APPARATUS FOR THE JACKETING OF STEEL PIPES

BACKGROUND OF THE INVENTION

The present invention relates to the jacketing of steel pipes by means of extruding a hose-like or tube-like thermoplastic foil onto such pipes.

The jacketing of steel in a manner using the basic principles of the field of art to which the invention pertains is, for example, carried out by means of an extruder head having one or more annular nozzles. A low-pressure chamber is provided at the head and particularly around the entrance for the pipe to be jacketed, into the head. This axial low-pressure or vacuum chamber is also provided with a sealing sleeve, tightly engaging the surface of the pipe. The purpose of this vacuum chamber is to generate a low pressure between the foil-hose as emerging from the extruder nozzle and the outer surface of the pipe so that the foil-hose is forced tightly against the pipe's surface, under exclusion of air bubbles. The pressure is about 500 mm water column. It is apparent that this low-pressure chamber must be sealed against the outer atmosphere, bearing in mind that the pipe must also pass through and must transit from atmospheric pressure to the reduced pressure chamber. The sealing is provided particularly by a rubber sleeve which tightly fits around the passing pipe.

The known construction is disadvantaged by the fact that the pipes are usually preheated to about 200° C. before entering the extrusion nozzle. As a consequence, the rubber sleeves leave smear marks on the pipe. These marks diminish the adhesion of the hose.

DESCRIPTION OF THE INVENTION

It is an object of the present invention to improve an apparatus for jacketing steel pipes, particularly in regard to sealing a low-pressure entrance side for such a pipe into and through an extrusion head.

It is a feature of the present invention to provide such sealing by means of a stack of slotted, annular spring steel disks.

It is an object of the present invention to avoid the deficiencies outlined above.

It is a specific object of the present invention to improve a pipe-jacketing apparatus which includes an extruder head with an annular nozzle for depositing a hose onto a pipe passing through the extruder head and which includes a low-pressure chamber through which the pipe passes for purposes of establishing a low pressure between the outer surface of the pipe passing through and the hose deposited thereon.

The apparatus, particularly in accordance with the specific object, is improved by the invention in that plural, annular spring steel disks are disposed at the entrance into the low-pressure chamber; the disks have slots to establish tongues which engage the pipe and are deflected in the direction of pipe travel, to seal the entrance to that chamber.

The preferred embodiment of the invention, the objects and features of the invention, and further objects, features and advantages thereof, will be better understood from the following description taken in connection with the accompanying drawings.

DESCRIPTION OF THE DRAWINGS

FIG. 3 is a front view of the specific improvement feature and combination of elements.

Proceeding now to the detailed description of the drawings, FIG. 1 illustrates a pipe 1 moving in the direction of the horizontal arrow, thereby passing sequentially each of the parts illustrated, beginning with a left-hand entrance funnel 15. A low-pressure or vacuum chamber 2 is provided next downstream from the funnel 15 and being disposed at the entrance side of an extruder head 3, the funnel with tubular extension constitutes the entrance into the low-pressure chamber 2.

Figure 1:
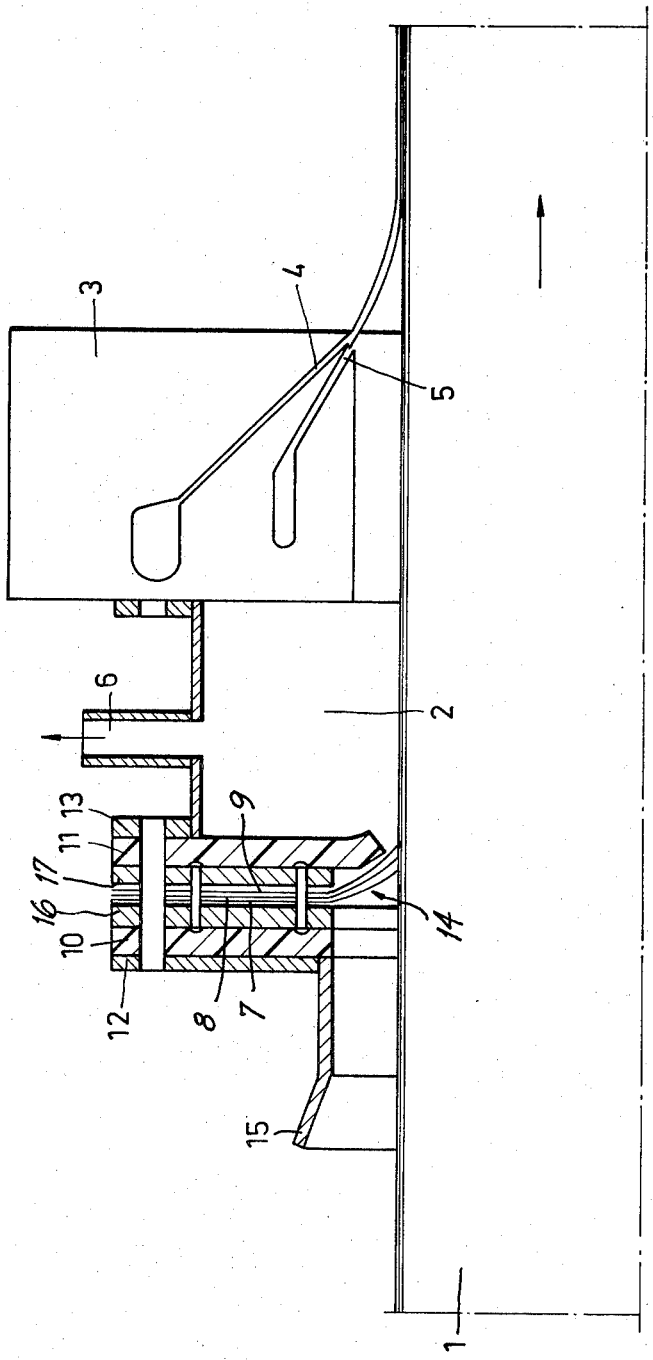
FIG. 1 is a longitudinal section through the upper portion of a pipe as passing through an extruder head with vacuum entrance chamber improved in accordance with the preferred embodiment of the invention for practicing the best mode thereof.
Figure 2:
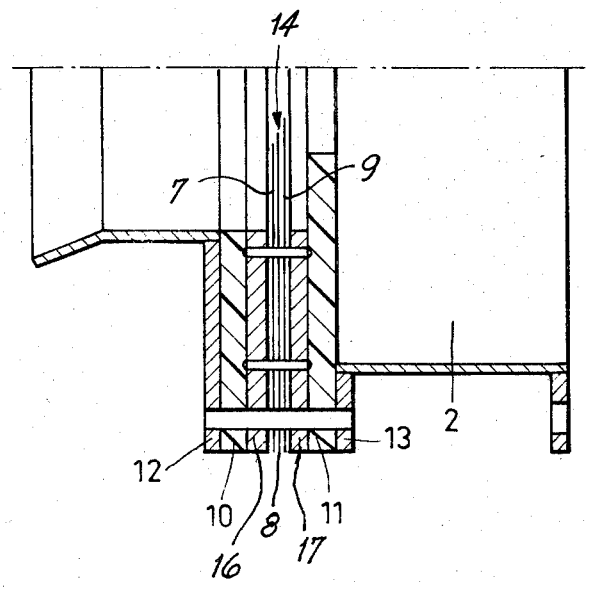
FIG. 2 is a similar view as FIG. 1, but without pipe and showing a lower section of the extruder head and vacuum chamber.

The head 3 has two annular extrusion nozzles 4 and 5, respectively, for extruding a thermoplastic material and an adhesive, both materials to be extruded in concentric relation to each other and onto and around pipe 1. Preferably, polyethylene is used as the basic cover or enveloping material emerging from nozzle 4; and the adhesive is preferably a copolymer of ethylene. Thus, a polyethylene hose with an internal adhesive lining is extruded toward and onto pipe 1.

As indicated by the vertical arrow, low pressure is produced in chamber 2 by a suitable suction device connected to an outlet tube 6. The pressure is to be about 500 mm water column.

The entrance funnel 15 is a part of a sealing structure which includes a first mounting annulus disk or ring 12 and a second one, 13. The upstream annular mounting ring or disk 12 is mounted on the end of funnel element 15, while the larger, inner diameter mounting disk 13 is mounted on the chamber 2. These mounting disks or rings 12 and 13 are provided for mounting the sealing structure to the described next.

The seal proper is comprised of, e.g., three annular disks 7, 8, and 9, made of spring steel. Each sealing annulus has an outer portion provided with registering bores which are traversed by bolts. These disks are held in the mounting rings 12 and 13 by means of these bolts. In addition, rubber rings 10 and 11, or rings of another elastic material, are mounted to the holding rings or disks 12 and 13 and by means of the same bolts. The ring 11 has a relatively small inner diameter, but that diameter is sufficiently large so that the pipe's surface will not be engaged.

Elastic ring 10 is sandwhiched between mounting ring or disk 12 and an annular spacer disk 16; analogously, ring 11 is held in between mounting disk or ring 13 and another ring disk-shaped spacer annulus 17. These spacer rings 16 and 17 define the holding space in between, additional spacer bolts extend between them. The spring disks 7, 8, and 9 have appropriate apertures accordingly.

The more inner portions of the ring disks 7, 8, and 9 are slotted to, thereby, define radially inwardly extending tongues 14. These tongues are staggered in the following sense. Each tongue covers, for example, an angle of 30° C., and the tongues of respectively two adjacent disks are annularly displaced by 10° C. Thus, the two outer spring disks 7 and 9 have their tongues cover the slots in disk 8. Moreover, the tongues of the upstream disk 7 are the shortest, the tongues of the middle disk 8 extend a little farther radially inwardly than the tongues of disk 7, and the tongues of the downstream disk 9 are the longest. In other words, the inner diameters of the rings 7, 8, and 9 increase in the direction of pipe propagation.

The radial length of all tongues is such that the inner diameter circle of all disks 7, 8, and 9 is smaller than the outer diameter of the pipe so that these tongues are bent in downstream direction as the pipe passes by. The tongues of ring 9 are urged against the resilient ring 11, whose inner portion is somewhat deflected and seals the slots of ring 9.

The invention is not limited to the embodiments described above; but all changes and modifications thereof, not constituting departures from the spirit and scope of the invention, are intended to be included.

We claim:

1. An apparatus for jacketing steel pipes, including an extruder having a head with annular extrusion nozzle means, for extruding a hose onto a pipe passing through the head, the head having an entrance chamber in which a low pressure is maintained to be effective between the outer surface of the pipe and the hose as it is being deposited, the improvement of an entrance construction for the pipe into the said chamber comprising a plurality of spring-elastic steel disks, each having an annular opening and radial slots so that radially inwardly directed tongues are being formed, said tongues engaging the pipe, the steel disks providing sealing of the chamber at its entrance for the pipe.

2. An apparatus as in claim 1, the slots in the disks of the plurality being staggeredly arranged so that a tongue of one of the disks covers a slot in an adjacent one of the disks.

3. An apparatus as in claim 1 or 2, said annular openings having different diameters.

4. An apparatus as in claim 3 and including annular holding means and resilient means for mounting said disks.

5. An apparatus as in claim 4, said annular resilient means including a resilient annular disk whose inner diameter is slightly larger than the inner diameter of the closest one of said steel disks.

6. An apparatus as in claim 1 or 2, the annular openings of said resilient disks having different inner diameters, increasing in a direction of pipe propagation.

* * * * *